United States Patent [19]

Gaidis et al.

[11] Patent Number: 5,145,748

[45] Date of Patent: * Sep. 8, 1992

[54] WATERPROOFING SYSTEM FOR WATER-PENETRABLE CONSTRUCTION SURFACES

[75] Inventors: James M. Gaidis, Ellicott City, Md.; Robert A. Wiercinski, Somerville, Mass.; Susan G. Ehrlich, Baltimore, Md.

[73] Assignee: W.R. Grace & Co.-Conn., New York, N.Y.

[ * ] Notice: The portion of the term of this patent subsequent to Jul. 21, 2009 has been disclaimed.

[21] Appl. No.: 481,004

[22] Filed: Feb. 16, 1990

Related U.S. Application Data

[63] Continuation-in-part of Ser. No. 368,640, Jun. 20, 1989, abandoned.

[51] Int. Cl.$^5$ .............................................. B32B 11/04
[52] U.S. Cl. .................................................... 428/489
[58] Field of Search ............... 428/489, 40; 52/309.8; 156/71, 337, 280; 404/31; 83/461; 524/35, 60

[56] References Cited

U.S. PATENT DOCUMENTS

| | | | |
|---|---|---|---|
| 3,741,856 | 6/1973 | Hurst | 428/489 X |
| 3,853,682 | 12/1974 | Hurst | 156/337 |
| 3,900,102 | 8/1975 | Hurst | 156/71 |
| 3,940,540 | 2/1976 | Schmidt | 428/489 X |
| 4,104,211 | 8/1978 | Keene | 524/35 |
| 4,151,025 | 4/1979 | Jacobs | 156/71 |
| 4,172,830 | 10/1979 | Rosenberg | 428/489 X |
| 4,176,102 | 11/1979 | Favata | 524/60 |
| 4,362,586 | 12/1982 | Uffner | 156/71 |
| 4,544,690 | 10/1985 | Ladish | 404/31 X |
| 4,597,817 | 7/1986 | Larsen | 156/280 |
| 4,600,657 | 7/1986 | Wegehaupt | 428/489 X |
| 4,619,166 | 10/1986 | Valavaara | 83/461 |
| 4,649,166 | 3/1987 | De Eatis | 524/35 |
| 4,707,961 | 11/1987 | Nunley | 52/309.8 |
| 4,731,399 | 3/1988 | Fitzgerald | 428/489 X |
| 4,774,115 | 9/1988 | Ruehl | 428/489 X |
| 4,775,567 | 10/1988 | Harkness | 428/40 |
| 4,789,578 | 12/1988 | Twyford | 428/40 |
| 4,897,313 | 1/1990 | Wiercinski . | |

*Primary Examiner*—Thomas J. Herbert, Jr.
*Attorney, Agent, or Firm*—William L. Baker; Craig K. Leon

[57] ABSTRACT

Disclosed are compositions and methods of reducing water penetration through civil engineering structures which methods comprise applying to the structures a waterproofing agent pretreatment composition including SBR latex, SBS latex, natural rubber latex, polybutadiene latex, polychloroprene latex, polyvinyl acetate latex, nitrile latex, or combinations thereof, and optionally may include various freezing point depressing agents to enable use of the compositions and methods at or below 25° F. Also disclosed are packages including the latex-containing waterproofing agent pretreatment compositions and waterproofing agents.

8 Claims, No Drawings

WATERPROOFING SYSTEM FOR WATER-PENETRABLE CONSTRUCTION SURFACES

This application is a continuation in part of application Ser. No. 360,640 filed Jun. 20, 1989, now abandoned.

BACKGROUND OF THE INVENTION

1. Field of the Invention

The present invention relates to compositions and methods useful for waterproofing or dampproofing various water-penetrable materials used in building construction and other civil engineering projects. The invented compositions are aqueous compositions including polymer latices useful as waterproofing agent pretreatments. The invented methods use these new aqueous pretreatment compositions as a component in a system to reduce water penetration through construction materials. The invention also includes packages including waterproofing agents and these new pretreatment compositions and structures to which these new pretreatment compositions and a waterproofing agent have been applied.

2. Description of Related Art

Various materials used in building construction and other civil engineering projects such as roads and bridges are susceptible to water penetration resulting either from their inherent properties or imperfections such as cracks or pores. Reducing or eliminating water penetration through structures formed of these materials often is desirable such as for below-grade building walls, and may be critical in certain structures such as those housing expensive electrical equipment or tunnels moving vehicular or pedestrian traffic under bodies of water. Available waterproofing agents include ethylene propylene diene monomer (EPDM) sheets, polyvinyl chloride sheets, Bentonite panels, built-up asphalt systems, coal tar-based, and other asphalt-based compositions. Asphalt-based compositions are preferred; most preferred are preformed, flexible sheet-like laminates of support film(s) and bituminous layer(s) (waterproofing laminates) such as described in U.S. Pat. Nos. 3,741,856; 3,853,682; and 3,900,102. Bituthene ® brand of waterproofing membrane is an example of preferred, commercially available asphalt-based waterproofing agents.

Many currently available waterproofing agents are very effective when applied correctly. For example, when using waterproofing laminates as a waterproofing agent on structures contaminated by dirt, dust, or efflorescence current practice requires that a pretreatment be applied to the structure before application of the waterproofing laminate. Most pretreatments commercially available are based upon volatile organic compounds and usually contain high levels of these compounds as solvents. Known aqueous pretreatments, such as asphalt emulsions, have not been used widely because of poor water immersion resistance and freeze/thaw resistance. Consequently, use of most commercially available pretreatments is fraught with disadvantages including the need to exercise great care to avoid fire hazard and atmospheric release of volatile organic compounds, or risk of failure resulting from poor water immersion resistance or poor low temperature applicability.

Therefore, despite use of waterproofing agents that require pretreatment, such as waterproofing laminates, for many years, there has been and remains a need for pretreatment compositions which eliminate use of volatile organic compounds without sacrificing the strength and duration of the bond between the waterproofing agent and structure and which can be applied when ambient temperatures are significantly below the freezing point of water.

Acrylic latex formulations including about 27 wt. % latex solids and about 9 wt. % 2-butoxyethanol, about 4 wt. % 2-(2-ethoxyethoxy) ethanol, and about 1 wt. % dibutyl phthalate are known for use as lacquers. These formulations may have freezing points at or below 32° F. but are not useful as waterproofing agent pretreatments at or below 25° F.

U.S. Pat. No. 4,897,313 describes use of water-based acrylic latex compositions as waterproofing agent pretreatments. These pretreatment compositions overcome many of the disadvantages of other known aqueous pretreatments but cannot be used at temperatures at or below 25° F.

Schmidt U.S. Pat. No. 3,940,540 teaches built-up roofing employing precoated felts inhibited from slipping by use of bituminous emulsions to bind the felts. A minor amount of compatible latex is incorporated into the emulsion to increase the adhesion of bonded felts.

Rosenberg et al. U.S. Pat. No. 4,172,830 is one of many examples of references disclosing sheet-like flexible materials used for waterproofing.

Uffner et al. U.S. Pat. No. 4,362,586 describes use of polyamide resins as primers for highway repairs using asphaltic membranes.

U.S. Pat. No. 4,731,399 discloses extending certain latices by addition of up to about 40% by weight of an emulsion of asphalt, bitumen, or coal tar. The extended latices are said to be useful in adhering scrim to carpet or in manufacture of attached foamed carpet backing.

Larsen U.S. Pat. No. 4,597,817 describes processes for preparation of a water-impervious surface coating on a substrate which comprises applying to the substrate an aqueous bitumen emulsion containing, in part, 5 to 55% by weight of an acrylic prepolymer.

Ladish U.S. Pat. No. 4,544,690 discloses an aqueous rubberized coal tar emulsion composition suitable for coating and sealing bituminous substrates containing asphalt in which the coal tar emulsion includes water admixed with a small amount of carboxylated butadiene/styrene/acid copolymer latex having a particular particle size.

Keene et al. U.S. Pat. No. 4,104,211 describes pipe sealants made from an aqueous emulsion of non-cationic asphalt and rubber.

Favata U.S. Pat. No. 4,176,102 teaches sealant asphaltic emulsion compositions having 20–50 parts by volume of a copolymer prepared by copolymerization of a vinyl acetate monomer with an organic acid.

DeFatis U.S. Pat. No. 4,619,166 teaches a mortar for waterproofing and protective coverings used in building and road construction wherein the mortar includes a mixture of an acrylic emulsion and finely ground clay which has been baked at a temperature range between 600° C. and 1,400° C.

Jacobs U.S. Pat. No. 4,151,025 describes use of volatile organic solvent-based primers with laminated waterproofing membranes.

SUMMARY OF THE INVENTION

The present invention relates to methods useful for attaching waterproofing agents to water-penetrable constructions materials, compositions useful in these methods, and structures resulting from use of these methods. More specifically, the present invention relates to using compositions including styrene-butadiene rubber latex, styrene-butadiene-styrene rubber latex, natural rubber latex, polybutadiene latex, polychloroprene latex, polyvinyl acetate latex, and/or nitrile latex in application of waterproofing agents to buildings and other civil engineering structures. The present invention includes water-based latex compositions useful in waterproofing construction materials at temperatures at or below about 25° F. and for other applications in which aqueous latex compositions are used at these temperatures.

DETAILED DESCRIPTION OF THE INVENTION

Optimal waterproofing of structures such as buildings, bridges, roads, and tunnels requires bonds between the structure and waterproofing agent which endure essentially for the life of the structure. These enduring bonds even are important in applications such as subterranean basements, where the backfill holds the waterproofing agent in place, to prevent migration along the surface of the structure of water which may enter through damaged areas of the waterproofing agent. To achieve enduring bonds between structures and asphalt or coal tar-based waterproofing agents, pretreatments usually are applied prior to application of the waterproofing agent. All the waterproofing agent pretreatments in current widespread use have high levels of volatile organic compounds, usually as solvents, and thus present potential fire hazards and sources of atmospheric release of volatile organic compounds.

The present invention resides in the discovery that when used as waterproofing agent pretreatments aqueous mixtures of styrene-butadiene rubber (SBR) latex, styrene-butadiene-styrene rubber (SBS) latex, natural rubber latex, polybutadiene latex, polychloroprene latex, polyvinyl acetate latex, and/or nitrile latex facilitate formation of strong and enduring bonds between waterproofing agents and the structure to which they are applied. The latices used in the aqueous-based pretreatments of the invented methods have the following characteristics:

Preferred SBR latices include styrene:butadiene polymers having styrene:butadiene ratios of from 1:99 to 60:40, more preferred are SBR latices having styrene:butadiene ratios of from about 20:80 to about 40:60. Stabilizers such as fatty acid surfactants or mixed acid surfactants are necessary ingredients in these latices.

Preferred SBS latices include styrene:butadiene polymers of number average molecular weights from about 100,000 to 2,000,000 having styrene:butadiene ratios of from about 10:90 to 40:60. Components in these latices include cationic, anionic, or nonionic surfactants and, optionally, tackifiers such as rosin esters. Preferred natural rubber and polybutadiene latices have a minimum weight average molecular weight of 50,000 and may contain some gel.

Generally, any SBR latex, SBS latex, natural rubber latex, polybutadiene latex, polychloroprene latex, polyvinyl acetate latex, and/or nitrile latex which, when used as a waterproofing agent pretreatment, provides bonds sufficiently strong and enduring to secure the waterproofing agent to the structure essentially for the life of the structure are used in this invention. Persons skilled in the art readily are able to select from SBR, SBS, natural rubber, polybutadiene, polychloroprene latex, polyvinyl acetate, or nitrile latices those which are operable in this invention. The Examples 20 and 21 Test procedures are examples of tests representing important performance criteria which are useful to determine whether latex-containing compositions are useful as waterproofing agent pretreatments.

The invented aqueous pretreatments and those used in the invented methods include one or more of the above latices in 1–70% by weight of solids, preferably 3–35% by weight of solids. Optional ingredients in these pretreatments include tackifiers such as emulsions of rosin esters or emulsions of hydrocarbon resins; antifungicides such as formaldehyde, oxazolidineheterocyclic amine, 2-[(hydroxymethyl)-amino]ethanol, or benzisothiazolin-3-one; thickeners such as cellulosic polymers, polyacrylic acid, or associative urethane; and cationic, or anionic, or nonionic surfactants. Asphalt emulsions, preferably in amounts of about 5 to about 20%, also are optional ingredients in the invented pretreatments. To help prevent mold, mildew growth and rust formation, if stored in ferrous metal containers, the pH of the invented pretreatments optionally is adjusted to about 8 to 9 by, for example, addition of ammonium hydroxide. Another optional ingredient is a freeze/thaw stabilizing agent such as ethylene glycol or propylene glycol. These are added at low levels (in comparison to freezing point depressing agents), for example about 1 to 3 wt. % of total formulation. These agents prevent coalescence (in the package) of pretreatments which freeze and thaw.

Preferred invented aqueous pretreatments are those which have a freezing point significantly below 32° F., preferably at least as low as 25° F. More preferred are aqueous pretreatments having a freezing point at or below 20° F. Surprisingly, it was discovered that various agents known to be useful as freezing point depressants in other applications also can be added to aqueous-based latex compositions in amounts sufficient to reduce the freezing point to at least about 25° F. without significantly affecting the utility of these compositions as waterproofing agent pretreatment compositions. Using standard techniques persons skilled in the art readily are able to determine such amounts.

Aqueous-based latex compositions are useful as waterproofing agent pretreatments only if after application and drying they allow for formation of a sufficiently strong and enduring bond between the subsequently applied waterproofing agent and structure being waterproofed. It was expected that addition of freezing point depressing agents to aqueous-based latex compositions in amounts sufficient to reduce the freezing point to about 25° F. would render such compositions unsuitable for use as waterproofing agent pretreatment compositions. Butoxypropanol, 10.4%, in a composition containing 28.4% SBR latex solids and 61.2% water is an example of a known freezing point depressing agent found not to be useful in aqueous-based latex waterproofing agent pretreatment compositions.

Various freezing point depressing agents were discovered to be useful in aqueous-based latex waterproofing agent pretreatment compositions having freezing points at or below 25° F. Latices useful in freezing point depressing agent-containing compositions are latices in which the latex polymer plus absorbed freezing point depressing agent has a minimum film forming temperature at or below 25° F. Freezing point depressing agents useful in this invention are agents which have: (1) infinite water solubility; (2) do not coagulate latex during preparation of a composition; and (3) have a vapor pressure at 25° C that is not more than about one-half the vapor pressure of water. Preferred freezing point depressing agents are those which have a solubility parameter $(cal/gm^3)^{\frac{1}{2}}$ that is about 2 or more units greater than the solubility parameter for the latex being used. Preferred freezing point depressing agents include $C_2$ to $C_5$ alkyl diols such as ethylene glycol, propylene glycol, and butane diol; N-methyl pyrrolidinone; and dimethyl formamide. Other useful freezing point depressing agents are methoxyethanol and methoxypropanol. Persons skilled in the art can determine useful freezing point depressing agents using well known techniques.

Example 20 provides data supporting the unexpected utility of these compositions as waterproofing agent pretreatments.

The preferred invented waterproofing agent pretreatment compositions include about 10 to about 65 wt. % latex solids, about 4 to about 33 wt. % freezing point depressing agent, and about 17 to about 80 wt. % water and may include other optional components. More preferred invented waterproofing agent pretreatment compositions include about 10 to about 53 wt. % latex solids, about 9 to about 33 wt. % freezing point depressing agent, and about 23 to about 80 wt. % water or about 16 to about 53 wt. % latex solids, about 9 to about 26 wt. % freezing point depressing agent, and about 23 to about 75 wt. % water. Most preferred are compositions containing about 20 wt. % latex solids and about 12 wt. % freezing point depressing agent. All pretreatment formulations should be prepared such that the ratio of freezing point depressing agent to latex solids is less than or equal to about 1 and the ratio of freezing point depressing agent to water is greater than or equal to about 0.12 but less than or equal to about 1. All wt. percentages of latex, freezing point depressing agent, and water are determined exclusive of any other components which may be included in the pretreatment composition. Compositions including higher concentrations of latex solids and freezing point depressing agents which are intended for dilution prior to use are within the above ranges if the diluted form is within these ranges.

The invented waterproofing agent pretreatment compositions also may include styrene maleic anhydride copolymer having a molecular weight of about 2,000 (SMA) and ammonia. Preferred compositions including SMA and ammonia have about 2 wt. % SMA and 0.4 wt. % ammonia.

As used in the specification and claims a waterproofing agent pretreatment(s) is a composition used as a surface conditioner or a composition used as a primer. A surface conditioner composition is applied to a structure surface to adhere dust and other contaminants to the surface thereby enhancing the mechanical integrity of the surface. Primers are compositions applied to structure surfaces which may perform the functions of surface conditioners. In addition primers also promote good initial adhesion of the waterproofing agent by filling in voids in microscopically rough structure surfaces thereby providing a smoother surface that is more receptive for bonding. Because of this characteristic the preferred waterproofing agent, a pressure sensitive adhesive waterproofing laminate, need not be as deformable to make good contact with a primed surface as would be the case for a conditioned surface. Also a primer layer because of its greater thickness than a conditioner layer generally is tacky. Tackiness also aids in promoting good initial adhesion. Primer compositions generally have a higher solids content than surface conditioner compositions.

In the invented methods, waterproofing materials based on coal tar or asphalt are used, asphalt-based waterproofing materials are preferred. Especially preferred are waterproofing materials constructed of preformed, flexible sheet-like laminates of support films and bituminous layers which shall be referred as waterproofing laminates. Various waterproofing laminates are commercially available. Bituthene ® brand waterproofing membranes are preferred commercially available waterproofing laminates.

Various civil engineering structures including, for example, buildings, bridges, roads, and tunnels, are made waterproof using the present invention. As used herein, making a structure "waterproof" means reducing or eliminating the ability of water to penetrate the structure. The present invention is used to make waterproof structures constructed of materials which are water-penetrable either inherently or as a result of imperfections such as cracks or pores. The types of water-penetrable construction materials with which the present invention is used include wood, brick, stone, blended cements, pozzolanic cements, or concrete, preferably Portland cement concrete.

According to the presently invented method for reducing water penetration through a structure, initially a pretreatment including one or more of the above latices is applied to a structure and allowed to dry. Thereafter, a waterproofing agent is affixed to the pretreatment-coated structure surface. Using the invented method, the pretreatment preferably is applied to a structure surface at a coverage rate of about 100-1200 sq. ft./gal., preferably about 100-400 sq. ft./gal. when used as a primer and 400-1,200 sq. ft./gal. when used as a surface conditioner. Other suitable coverage rates and film thicknesses are readily determined by persons skilled in the art.

Waterproofing laminates are the preferred waterproofing agents for use in the invented methods. Preferred waterproofing laminates have a bituminous layer comprised of about 29-60% by weight asphalt, about 25-55% by weight process oil, about 10-35%, preferably 16-35% by weight of a thermoplastic block polymer of styrene and butadiene monomers or random styrene and butadiene rubber polymers. As used herein, the weight percent of asphalt, process oil, and thermoplastic block polymer of butadiene and styrene is calculated based on the total of these components not including fillers, which may be included in amounts of up to 50%, preferably 10-20%, by weight of the total weight of asphalt, process oil, thermoplastic block polymer of butadiene and styrene, and filler, or any other components.

In more preferred waterproofing laminates the asphalt used has the following alumina separation (ASTM D4124) ranges and preferred ranges:

|  | Range | Preferred Range |
| --- | --- | --- |
| Saturates | 5-25% | 8-15% |
| Naphthenic Aromatics | 15-40% | 32-40% |
| Polar Aromatics | 30-50% | 40-46% |
| Asphaltenes | 5-30% | 8-15% |

Also, in the preferred waterproofing laminates the preferred process oil for use in the bituminous layer has the following clay gel separation (ASTM D-2007) ranges:

| Saturates | 10–30% |
| --- | --- |
| Polar Compounds | 10–20% |
| Aromatics | 50–85% |
| Asphaltenes | 0–0.5% |

Additionally, in the preferred waterproofing laminates preferred thermoplastic block polymers of styrene and butadiene monomers are mixtures of polymers having a butadiene:styrene ratio of about 70:30 and a block polystyrene content of about 30% (high molecular weight polymer) and polymers having a butadiene:styrene ratio of about 75:25 and a block polystyrene content of about 18% (low molecular weight polymer). More preferred are polymers in which the ratio of the low molecular weight polymer to the high molecular weight polymer is in the range of 5:1 to 1:1; most preferred are polymers wherein the ratio of low molecular weight polymer to high molecular weight polymer is about 3.8:1 or 2:1. In the preferred waterproofing laminates including random styrene and butadiene rubber polymers, the preferred styrene:butadiene ratio is in the range of 1:99 to 35:65, the most preferred range is 15:85 to 28:72.

In another aspect the present invention is a package including an aqueous-based pretreatment including one or more of the above latices and a waterproofing laminate used in the presently invented methods. The invention also includes a structure to which has been attached a presently invented latex pretreatment and a coal tar or asphalt-base waterproofing agent used in the invented methods.

Contemplated equivalents of the present invention include methods for reducing water penetration through a structure that comprise using other aqueous pretreatments which include latices that are compatible with the waterproofing agent with which they are used and that produce strong and enduring bonds between waterproofing laminates and the structure to which they are applied. Other contemplated equivalents are aqueous-based latex compositions useful as waterproofing agent pretreatment compositions at temperatures below the freezing point of water. Equivalent compositions are determined by mixing a waterproofing agent-compatible latex and a freezing point depressing agent and testing as described herein to determine whether the composition facilitates formation of sufficiently strong and enduring bonds between the waterproofing agent and structure.

The following examples provide specific illustrations of the invention, but are not intended to limit the scope of the invention as described above and claimed below.

EXAMPLE 1

SBR LATEX PRETREATMENT

A waterproofing agent pretreatment composition was prepared from Butonal NS 175 ® (BASF), an SBR latex including a styrene:butadiene polymer having a styrene:butadiene ratio of 24:76 and fatty acid as a surfactant. This SBR latex (36.2% w/w) and water (63.8% w/w) were charged into a mixer and stirred until blended, approximately 5 minutes. This SBR latex pretreatment had 25% solids.

EXAMPLE 2

SBR LATEX PRETREATMENT

Using the process of Example 1 a SBR latex pretreatment was prepared except that the Butonal NS 175 ® SBR latex and water each were added at 50% w/w to yield a pretreatment composition having 35% solids.

EXAMPLE 3

SBR LATEX PRETREATMENT

Using the process of Example 1 an SBR latex pretreatment was prepared from Butonal NS 175 ® SBR latex (18.1% w/w), Aquatac-6025 ® Arizona Chemical Co. (20.8% w/w), a hydrocarbon resin emulsion tackifying agent, and water (61.1% w/w). This pretreatment composition had 25% total solids.

EXAMPLE 4

SBR LATEX PRETREATMENT

Using the process of Example 1 an SBR latex pretreatment was prepared from Butonal NS 175 ® SBR latex (18.1% w/w), Aquatac-6025 ® (20.8% w/w), a rosin ester resin emulsion tackifying agent, and water (61.1% w/w). This pretreatment composition had 25% total solids.

EXAMPLE 5

SBR LATEX PRETREATMENT

Using the process of Example 1 an SBR latex pretreatment was prepared from Butonal NS 175 ® latex (27.2% w/w), Aquatac 6085 (10.4% w/w), a rosin ester resin emulsion tackifying agent, and water (62.2% w/w). This pretreatment composition had 25% total solids.

EXAMPLE 6

SBR LATEX PRETREATMENT

An SBR latex pretreatment was prepared as in Example 5 except that Aquatac 6025 ® (10.4% w/w), a hydrocarbon resin emulsion tackifying agent was used and yielded a pretreatment composition containing 25% solids.

EXAMPLE 7

SBR LATEX PRETREATMENT

A waterproofing agent pretreatment composition was prepared according to the Example 1 procedure using Butonal NS 198 ® (BASF), an SBR latex including styrene:butadiene polymer having a styrene:butadiene ratio of 24:76 and a fatty acid as a surfactant. This SBR latex (39.7% w/w) and water (60.3% w/w) were mixed to yield a pretreatment composition having 25% solids.

EXAMPLE 8

SBR LATEX PRETREATMENT

Using the process of Example 7, an SBR latex pretreatment was prepared except that the Butonal NS 198 ® SBR latex and water each were added at 50% w/w to yield a pretreatment composition having 32% solids.

EXAMPLE 9

SBR LATEX PRETREATMENT

Using the process of Example 1 an SBR latex pretreatment composition was prepared from Butonal NS 125 ® (BASF, an SBR latex including a styrene:butadiene polymer having a styrene:butadiene ratio of 31:69 and a fatty acid as a surfactant. This SBR latex (35.4% w/w), water (65.6% w/w), and ethylene glycol (2.5% w/w) were mixed to yield a pretreatment composition containing 25% solids.

EXAMPLE 10

SBR LATEX PRETREATMENT

Using the process of Example 1 an SBR latex pretreatment was prepared using Butonal NS 131 ® (BASF) an SBR latex including a styrene:butadiene polymer having a styrene:butadiene ratio of 35:65 and a fatty acid as a surfactant. This SBR latex (35.7% w/w), water (64.2% w/w) and ethylene glycol (2.5% w/w) were mixed to yield a pretreatment composition having 25% solids.

EXAMPLE 11

SBR LATEX PRETREATMENT

Using the process of Example 1 an SBR latex pretreatment was prepared from Pliolite LPF 6733 ® (Goodyear Tire and Rubber Co.) an SBR latex including a styrene:butadiene polymer having a styrene:-butadiene ratio of 34:66 and a mixed acid surfactant. This SBR latex (36.2% w/w), water (63.8% w/w), and ethylene glycol (2.5% w/w) were mixed to yield a pretreatment composition having 25% solids.

EXAMPLE 12

SBR LATEX PRETREATMENT

Using the process of Example 1 an SBR latex pretreatment was prepared from Pliolite LPF 6738 ® (Goodyear Tire & Rubber Co.) an SBR latex including a styrene:butadiene polymer having a styrene:butadiene ratio of 29:71 and a mixed acid surfactant. This SBR latex (36.2% w/w), water (63.8% w/w), and ethylene glycol (2.5% w/w) were mixed to yield a pretreatment composition having 25% solids.

EXAMPLE 13

SBR LATEX PRETREATMENT

Using the process of Example 1 an SBR latex pretreatment was prepared from Pliolite LPF 5356, an SBR latex including a styrene:butadiene polymer having a styrene:butadiene ratio of 23.5:76.5 and a fatty acid surfactant. This SBR latex (36.2% w/w), water (63.8% w/w), and ethylene glycol (2.5% w/w) were mixed to yield a pretreatment composition having 25% solids.

EXAMPLE 14

SBR LATEX PRETREATMENT

Using the process of Example 1 an SBR latex pretreatment was prepared except that the Polysar 275 ® (BASF) SBR latex was added at 10% w/w and the pretreatment composition also contained 10% solids of asphalt emulsion (SS-1H, designating a slow setting grade with a residue penetration of 40-90 dmm, a hard grade) and 0.15% Carbopol 934 ® (B. F. Goodrich) polyacrylic acid thickener. This pretreatment composition had 20% solids.

EXAMPLE 15

NATURAL RUBBER LATEX PRETREATMENT

A waterproofing agent pretreatment composition was prepared from Hartex 103 ® (Firestone Tire and Rubber Company) a natural rubber latex having the following chemical and/or physical characteristics: 62% solids, KOH number=0.55, and pH=9.8. This natural rubber latex (50.0% w/w) and water (50.0% w/w) were charged into a mixer and stirred until blended, approximately 5 minutes. This natural rubber pretreatment had 31% solids.

EXAMPLE 16

POLYBUTADIENE LATEX PRETREATMENT

A waterproofing agent pretreatment composition was prepared from LPM 2374 ® (Goodyear Tire and Rubber Co.) a polybutadiene latex. This polybutadiene latex (41.7% w/w) and water (58.3% w/w) were charged into a mixer and stirred into a blended composition for approximately 5 minutes. This polybutadiene latex pretreatment had 25% solids.

EXAMPLE 17

SBR LATEX PRETREATMENT

A waterproofing agent pretreatment composition was prepared from Kraton G 1657 ® (Shell Oil Company), an SBS block copolymer having a styrene:-butadiene ratio of 30:70 and a rosin ester. The pretreatment composition was prepared by emulsifying the SBS block copolymer and rosin ester in water with an ionic surfactant in amounts yielding a total solids content of 43%.

EXAMPLE 18

POLYCHLOROPRENE LATEX PRETREATMENT

A waterproofing agent pretreatment composition was prepared from Despercoll C-84 ® (Mobay), a polychloroprene latex. This latex was diluted with water to yield a composition having 28.4% latex solids and blended for approximately 5 minutes.

EXAMPLE 19

POLYVINYL ACETATE LATEX PRETREATMENT

A waterproofing agent pretreatment composition was prepared from Daraweld C ® (W. R. Grace & Co.-Conn.), a polyvinyl acetate latex. This latex was diluted with water to yield a composition having 28.4% latex solids and blended for approximately 5 minutes.

EXAMPLE 20

PRETREATMENTS INCLUDING FREEZING POINT DEPRESSING AGENT

Table I shows results of testing aqueous-based waterproofing agent pretreatment compositions including latex solids 28.4 wt. %, freezing point depressing agent 10.4%, and water. In compositions containing SMA and ammonia, SMA 2.0 wt. % and ammonia 0.4 wt. % replaced an equivalent amount of water.

Compositions not including SMA and ammonia were prepared by mixing the water with the freezing point depressing agent and then adding the water/freezing point depressing agent mixture to the latex dropwise with stirring.

Compositions including SMA and ammonia were prepared by mixing water with ammonium hydroxide solution. SMA (SMA 3000, Atochem, Inc., M.W.=1900) was stirred into the mixture and the mixture then was stirred until the SMA was dissolved. Then the SMA/ammonia/water mixture was added dropwise to the latex mixture while stirring. Thereafter, the freezing point depressing agent was added dropwise to the mixture with stirring.

The adhesion test procedure consists of coating a pretreatment composition onto a cast concrete block at a coverage rate of approximately 400 sq. ft./gal. The coated block then is force air dried at room temperature for about two hours. Next, an about 3" by 6" sample of waterproofing laminate is applied to the block and quickly rolled four times with a thirty-pound roller. After aging for one day at room temperature adhesion is measured using an Instron ® mechanical tester (tensile testing machine) using a peeloff angle of 90° and a crosshead speed of 2" per minute.

TABLE I

| Latex | Freezing Point Depressing Agent | SMA/NH$_3$ | Bond Strength lb/in |
|---|---|---|---|
| SBR (Butonal NS 175$^{(R)}$) | None | — | 10.4 |
| | None | Yes | — |
| | Ethylene Glycol | — | 3.8 |
| | Ethylene Glycol | Yes | 13.5 |
| | Propylene Glycol | — | 9.0 |
| | Propylene Glycol | Yes | 14.4 |
| | DMF | — | 11.8 |
| | DMF | Yes | 11.6 |
| | N-methyl Pyrolidinone | — | 7.8 |
| | N-methyl Pyrolidinone | Yes | 11.0 |
| | Butanediol | — | 8.0 |
| | Butanediol | Yes | 15.4 |
| | Methoxyethanol | — | 13.6 |
| | Methoxyethanol | Yes | 14.0 |
| | Methoxypropanol | — | 12.6 |
| | Methoxypropanol | Yes | 14.8 |
| Chloroprene (Dispercoll C-84$^{(R)}$) | None | — | 4.7 |
| | Ethylene Glycol | — | 5.6 |
| | Propylene Glycol | — | 6.3 |
| | Butanediol | — | 3.6 |
| | DMF | — | 3.7 |

EXAMPLE 21

SLOW PEEL TESTING

The following procedure was used for slow peel testing. The waterproofing laminate used in this testing has a rubberized asphalt layer including asphalt, thermoplastic block polymers of styrene and butadiene, and process oil and a support film of crosslaminated polyethylene. The control pretreatment is a commercially available composition containing about 12% styrene:-butadiene block copolymer and 12% Nevchem-140 ® (alkylated aromatic nonsaponifiable petroleum hydrocarbon resin with a softening point of about 140° C) in xylene.

According to the test procedure a concrete block initially is sprayed with a pretreatment composition at a target coverage range of 400-500 sq. ft. per gallon. Then the pretreatment composition is allowed to dry for approximately about 2 hours, and a 3" by 6" sample of waterproofing laminate is applied and quickly rolled four times with a 30-pound roller. Next, a 100 g weight is attached to a tab along one of the short sides of the waterproofing laminate and the waterproofing laminate is placed in a vertical position with the weighted side elevated. Waterproofing laminate displacement as a function of time is monitored.

Table II shows test results of the latex pretreatment compositions of the previous examples. Also tested as described in this example, but not shown in the Table, were several pretreatment compositions in which the latex was carboxylated SBR latex pretreatment compositions and acrylic pretreatment compositions had greater than 6 inches movement after 5 days.

TABLE II

| Pretreatment Composition | Displacement (in.) with time (days) | | | | | | | | | |
|---|---|---|---|---|---|---|---|---|---|---|
| | 1 | 2 | 3 | 5 | 6 | 8 | 9 | 10 | 12 | 16 |
| Control | | 1.1 | 1.1 | | 1.3 | | | 1.8 | | 1.8 |
| Example 1 | 0 | | | | .12 | | | .9 | | |
| Example 2 | .05 | | | .05 | .1 | .1 | | | | |
| Example 3 | .06 | .31 | | .5 | | | | .62 | 1.4 | |
| Example 4 | 0 | .19 | | .31 | | | | .31 | | .56 |
| Example 5 | 0 | .12 | | .25 | | | | .25 | | .38 |
| Example 6 | 0 | .12 | | .25 | | | | .25 | | .38 |
| Example 7 | .06 | .06 | | .125 | | | | .25 | | .25 |
| Example 8 | .15 | | | | .5 | | | | | |
| Example 9 | .06 | .06 | .25 | .25 | | | | .37 | | .44 |
| Example 10 | .03 | .06 | .16 | .16 | | | | .25 | | .25 |
| Example 11 | .25 | .25 | .37 | .37 | | | | .94 | | 1.3 |
| Example 12 | .12 | .25 | .25 | .44 | | | | .75 | | 1.5 |
| Example 13 | .19 | .19 | .37 | .44 | | | | .81 | | 1.4 |
| Example 14 | .03 | .06 | | | | 1.0* | | 1.75 | | 6** |
| Example 15 | 0 | 0 | | 6+ | | | | | | |
| Example 16 | | 0 | | .09 | | | 1.15 | | 1.3 | |
| Example 17 | .5 | .56 | | 2.0 | | | | 6+ | | |

*7-day data
**18-day data

EXAMPLE 22

WATER IMMERSION TESTING

Samples for testing were prepared by spraying a concrete block with a pretreatment at a target coverage range at about 400-500 sq. ft./gallon. Then the pretreatment was allowed to dry for 2 hours and a 3" by 6" sample of waterproofing laminate, as used in Example 17, was applied and rolled four times with a 30-pound roller. The samples were maintained for 1 day dry and then immersed in water for 28 days. Thereafter, adhesion was measured C using an Instron ® mechanical tester (tensile testing machine) using a peeloff angle of 90° and a crosshead speed of 2" per minute. The data obtained is shown in Table III in which the control is an organic solvent-based primer containing solvent, SBS block copolymer, and a hydrocarbon resin.

TABLE III

| Pretreatment Composition | Bond Strength lb/in |
| --- | --- |
| Control | 5.0 |
| Example 1 | 4.8 |
| Example 9 | 5.5 |
| Example 10 | 4.5 |
| Example 11 | 4.6 |
| Example 12 | 5.4 |
| Example 13 | 4.8 |
| Example 14 | 2.8 |

EXAMPLE 23

LOW TEMPERATURE INITIAL ADHESION

Prior to sample preparation all materials are equilibrated at 40° F. Then, in a 40° F. environment a concrete block is sprayed with a pretreatment composition at a target coverage range of about 400–500 sq. ft./gallon and is allowed to dry for about 2 hours. Then, while continuing to work in a 40° F. environment a 3"×6" sample of waterproofing laminate, as used in Example 17, is applied to the concrete block and quickly rolled with a 30-pound roller. After maintaining the sample for one day at 40° F. adhesion is measured using an Instron® mechanical tester (tensile measuring instrument) using a peeloff angle of 90° and a crosshead speed of 2"/minute. Test data is shown in Table IV in which the control is the same as in Example 22.

TABLE IV

| Pretreatment Composition | Bond Strength lb/in |
| --- | --- |
| Control | 1.7 |
| Example 1 | 2.4 |
| Example 9 | 2.1 |
| Example 10 | 2.4 |
| Example 11 | 3.2 |
| Example 12 | 1.8 |
| Example 13 | 1.4 |

We claim:

1. A waterproofing package, comprising:
   an aqueous-based waterproofing pretreatment composition operative to strengthen adhesion between a water penetrable surface having dust particles thereon and the pressure sensitive adhesives of a sheet-like waterproofing laminates, said composition including SBR latex, SBS latex, natural rubber latex, polybutadiene latex, polyvinyl acetate latex, or a combination thereof, and further including from 1% to 70% by weight solids and a surfactant; and
   a sheet-like waterproofing laminate comprised of a support film and pressure sensitive adhesive, said laminate operative to adhere to a surface pretreated with said composition.

2. The waterproofing package of claim 1 wherein said waterproofing laminate has a bituminous layer including about 0–20% by weight asphalt, about 25–50% by weight process oil, and about 10–35% by weight of a thermoplastic block polymer of styrene and butadiene monomers or random styrene and butadiene rubber polymer.

3. The waterproofing package of claim 1 wherein said package is applied to a waterpenetrable surface.

4. The waterproofing package of claim 1 wherein said composition further comprises a freezing point depressing agent in an amount sufficient to reduce the pretreatment composition's freezing point to not more than about 25° F.

5. The waterproofing package of claim 4 wherein said freezing point depressing agent has a solubility parameter that is at least 2 units $(cal./gm^3)^{\frac{1}{2}}$ greater than the latex selected.

6. The waterproofing package of claim 5 wherein said composition comprises SBR latex which includes styrene:butadiene polymers having styrene:butadiene ratios between about 1:99 and about 60:40 of the SBS latex includes styrene:butadiene:styrene polymers having molecular weights between about 100,00 to 2,000,000 and styrene:butadiene ratios from about 10:90 to 40:60.

7. The waterproofing package of claim 6 wherein said freezing point depressing agent is ethylene glycol or propylene glycol.

8. The waterproofing package of claim 7 wherein the styrene:butadiene polymer has a styrene:butadiene ratio of about 20:80 to about 40:60.

* * * * *